United States Patent

Takaya et al.

[11] Patent Number: 5,770,317
[45] Date of Patent: Jun. 23, 1998

[54] ORIENTED POLYESTER FILM

[75] Inventors: Katsuhiko Takaya; Tetsuo Ueno, both of Kurashiki, Japan

[73] Assignee: Asahi Kasei Kogyo Kabushiki Kaisha, Osaka, Japan

[21] Appl. No.: 727,423

[22] PCT Filed: Apr. 13, 1995

[86] PCT No.: PCT/JP95/00724

§ 371 Date: Jan. 15, 1997

§ 102(e) Date: Jan. 15, 1997

[87] PCT Pub. No.: WO95/28438

PCT Pub. Date: Oct. 26, 1995

[30] Foreign Application Priority Data

Apr. 14, 1994 [JP] Japan .................................. 6-075874

[51] Int. Cl.$^6$ .................................................. B32B 27/06
[52] U.S. Cl. ...................... 428/480; 428/483; 528/308.6; 528/295.5
[58] Field of Search ................................. 528/272, 308.6, 528/295.5; 428/480, 483

[56] References Cited

FOREIGN PATENT DOCUMENTS 4-306239  10/1992  Japan .
5-239198   9/1993  Japan .

Primary Examiner—Christopher Raimund
Attorney, Agent, or Firm—Birch, Stewart, Kolasch & Birch, LLP

[57] ABSTRACT

A copolyester film having a planar orientation of from 0.04 to 0.15 is disclosed, wherein said copolyester has a reduced viscosity of from 0.8 dl/g to 1.6 dl/g and comprises dicarboxylic acid components including terephthalic acid as the main component, 1,4-butanediol, and diol components including at least one kind of diol represented by following formula (I), wherein when the content of the diol of the formula (I) in which m is 2 is less than 0.2 mole % based on all the acid components, the content of 1,4-butanediol is from 55 mole % to 85 mole % and the content of the diol of the formula (I) in which m is 1 is from 15 mole % to 45 mole % in 100 mole % of the total diol components excluding the diol of the formula (I) in which m is 2; and when the content of the diol of the formula (I) in which m is 2 is from 0.2 mole % to 3 mole %, the content of 1,4-butanediol is from 55 mole % to 90 mole % and the content of the diol of the formula (I) in which m is 1 is from 10 mole % to 45 mole % in 100 mole % of the total diol components excluding the diol of the formula (I) in which m is 2;

$$HO\text{-}\!\!-\!\!(CH_2CH_2)_m O\text{-}\!\!]_n\!\!-\!\!H \quad\quad (I)$$

wherein m is 1 or 2, when m is 1, n is an integer of from 2 to 4, and when m is 2, n is a real number of from 6 to 55. The polyester film is useful for a wrapping film and excellent in the barrier property for odor and in flexibility, and shows a stable elastic modulus with the passage of time.

6 Claims, No Drawings

ORIENTED POLYESTER FILM

FIELD OF TECHNOLOGY

The present invention relates to a copolyester film suitable for a copolyester wrapping film being mainly used for wrapping foods, and to a copolyester composition film having an excellent self-adherence property.

BACKGROUND ART

A wrapping film is generally used for the food preservation in homes and in business uses, and also in the case of heating foods using a microwave oven.

A wrapping film is required to have a barrier property for an odor at a food preservation and also is required to have a high heat resistance without being broken by heating in a microwave oven.

Furthermore, a wrapping film is required to have a proper flexibility for efficiently wrapping or tightly closing up foods, etc., and further a wrapping film is desired to have a self-adherence property.

Hitherto, as a wrapping film, films of a vinylidene chloride copolymer and polyethylene have been generally used.

However, the vinylidene chloride series wrapping film is insufficient in the heat resistance such as causing breaking of the film when the wrapped material with the film is too heated for a long time in a microwave oven, and shows a large heat shrinkage. Also, the polyethylene series wrapping film is further insufficient in the heat resistance and inferior in the barrier property for odor. Accordingly, the development of a new film, which has a high heat resistance and an excellent barrier property for odor, is flexible, and preferably has a self-adherence property, has been desired and also the development of a new polyester film having the foregoing properties has been expected from the point of a food sanitation.

Hitherto, many copolyester films obtained by copolycondensation of components capable of forming flexible copolymers have been proposed. For example, many copolyesters each having a low melting point and low elasticity composed of dicarboxylic acids such as mainly terephthalic acid and a selected diol, and also many film thereof have been proposed. However, since they aim at being used as adhesives, they are provided as non-oriented films and do not have the characteristics suitable for wrapping films.

For using wrapping films, a polybutylene terephthalate (PBT) film and a film of a copolyester composed of a long-chain dicarboxylic acid and polytetramethylene glycol have been proposed but these films have not yet simultaneously satisfied the heat resistance, the barrier property for odor, the flexibility, and the self-adherence property required for a wrapping film.

JP-A-61-276820 (U.S. Pat. No. 4,725,483 or EP-86304146.3) (the term "JP-A" as used herein means an "unexamined published Japanese patent application") discloses a copolyester film composed of at least 85 mole % of terephtalic acid, from 65 to 97 mole % of 1,4-butanediol, and from 3 to 35 mole % of polyethylene glycol having a molecular weight of from 106 to 550. The polyester film has the main endothermic peak at a temperature of from 160° C. to 220° C. and the subsidiary endothermic peak at a temperature of from 30° C. to 80° C., and the area of the portion having the side endothermic peak of not less than 40° C. is in the range of from 3 to 20% of the area of the main endothermic peak.

JP-A-59-11383 discloses a hot melt adhesive composed of a polyester having a melting point of from 80° C. to 160° C. and composed of from 90 to 50 mole % of terephthalic acid, from 30 to 75 mole % of 1,4-butanediol, from 70 to 25 mole % of diethylene glycol, and polytetramethylene glycol having a molecular weight of from 500 to 6,000 in an amount of from 0.1 to 5 mole % based on the total acid components.

DE-4027353 (JP-A-5-194720) discloses a wrapping film for foods being heated in a microwave oven, which is composed of terephthalic acid and/or isophthalic acid, an alkylene glycol having a carbon atom number of from 1 to 6, and a polyoxyalkylene glycol having a weight average molecular weight of from 900 to 4,000.

JP-A-4-306239 discloses a wrapping film for wrapping foods, which is at least uniaxially oriented and has a Young's modulus of from 1 to 50 kg/cm$^2$, said wrapping film being composed of from 40 to 99 mole % of an aromatic dicarboxylic acid and from 60 to 1 mole % of a long-chain aliphatic dicarboxylic acid residue represented by dimer acid, wherein the temperature difference between the cold crystalline temperature thereof and the glass transition temperature is not higher than 60° C.

However, these copolyesters obtained by the conventional methods are reluctant to simultaneously satisfy the heat resistance, the barrier property for odor, and the flexibility required for a wrapping film, in particular, for a wrapping film for wrapping foods. Also, in the copolyester having a low glass transition temperature by being rendered flexible, the elastic modulus thereof is changed with the passage of time at storing the polyester film, thereby the polyester film is unsuitable as a commercial article. Furthermore, these copolyester films are generally poor in the self-adherence property and hence the close contact property required for a wrapping film is hard to obtain.

An object of the present invention is to provide a copolyester which is suitable for a wrapping film, in particular, for a wrapping film for wrapping foods, is excellent in the barrier property for odor, has a proper flexibility, shows a stable elastic modulus with the passage of time, and can be used even as a single layer.

Another object of the present invention is to provide a copolyester film which is excellent in the self-adherence property in addition to the foregoing properties.

DISCLOSURE OF THE INVENTION

That is, the present invention provides a copolyester film having a planar orientation of from 0.04 to 0.15, wherein said copolyester has a reduced viscosity of from 0.8 dl/g to 1.6 dl/g and comprises dicarboxylic acid components including terephthalic acid as the a component, 1,4-butanediol, and diol components including at least one kind of diol represented by following formula (I), wherein when the content of the diol shown by the formula (I) in which m is 2 is less than 0.2 mole % based on all the acid components, the content of 1,4-butanediol is from 55 mole % to 85 mole % and the content of the diol shown by the formula (I) in which m is 1 is from 15 mole % to 45 mole % in 100 mole % of the total diol components excluding the diol shown by the formula (I) in which m is 2; and when the content of the diol shown by the formula (I) in which m is 2 is from 0.2 mole % to 3 mole %, the content of 1,4-butanediol is from 55 mole % to 90 mole % and the content of the diol shown by the formula (I) in which m is 1 is from 10 mole % to 45 mole % in 100 mole % of the total diol components excluding the diol shown by the formula (I) in which m is 2;

wherein m is 1 or 2, when m is 1, n is an integer of from 2 to 4, and when m is 2, n is a real number of from 6 to 55.

According to another aspect of the present invention provides a copolyester film having a planar orientation of from 0.04 to 0.15 and containing from 1.5 parts by weight to 10 parts by weight of at least one kind of compound selected from the compounds represented by following formula (II), the compound represented by following formula (III), and sorbitan fatty acid ester(s) (having from 8 to 22 carbon atoms in fatty acid moiety) based on 100 parts by weight of a copolyester, said copolyester having a reduced viscosity of from 0.8 dl/g to 1.6 dl/g and comprising dicarboxylic acid components including terephthalic acid as the main component, 1,4-butanediol, and diol components including at least one diol represented by the formula (I) described above, wherein when the content of the diol shown by the formula (I) in which m is 2 is less than 0.2 mole %, the content of 1,4-butanediol is from 55 mole % to 85 mole % and the content of the diol shown by the formula (I) in which m is 1 is from 15 mole % to 45 mole % in 100 mole % of the total diol components excluding the diol shown by the formula (I) in which m is 2; and when the content of the diol shown by the formula (I) in which m is 2 is from 0.2 mole % to 3 mole %, the content of 1,4-butanediol is from 55 mole % to 90 mole % and the content of the diol shown by the formula (I) in which m is 1 is from 10 mole % to 45 mole % in 100 mole % of the total diol components excluding the diol shown by the formula (I) in which m is 2;

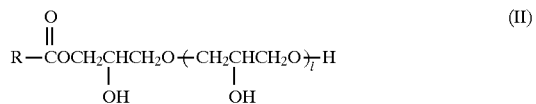

wherein l represents an integer of from 0 to 3 and R represents the alkyl residue of a saturated or unsaturated fatty acid having from 8 to 22 carbon atoms;

wherein R represents the alkyl residue of a saturated or unsaturated fatty acid having from 8 to 22 carbon atoms.

The term "all the acid components" herein means all the polycarboxylic acid components having a carboxyl group participating in the ester polycondensation reaction.

Then, the present invention is described in detail.

It is indispensable that the copolyester in the present invention has the specific composition for showing the desired performance. In particular, in the copolyester film of the present invention, it is important to keep the crystalline property of the polyester film for holding the heat resistance and further not losing the barrier property for odor and for the purpose, terephthalic acid in the dicarboxylic acid components and 1,4-butanediol in the diol components are inevitable.

For the purpose, it is preferred that the ratio of terephthalic acid in all the acid components is at least 90 mole % and all the acid components may be terephthalic acid.

Another indispensable components of the diol components constituting the copolyester being used in the present invention are diols shown by the formula (I), that is polyethylene glycol (hereinafter, is referred to as PEG) shown as the diol of the formula (I) in which m is 1 and/or polytetramethylene glycol (hereinafter, is referred to as PTMG) shown as the diol of the formula (I) in which m is 2.

By copolymerizing PEG, the polyester film obtained can be rendered flexible while keeping the crystalline property of the polyester film and maintaining the melting point of the polyester at a specific range, and further the barrier property for odor can be kept good. Also, by copolymerizing PTMG, the polyester film obtained can be rendered flexible while maintaining the heat resistance thereof without lowering too much the melting point of the polyester film, and thus the heat resistance of the polyester film can be improved as compared with the case of using PEG singly. Thus, said diols may be used singly or as a mixture thereof but it is preferred to use both PEG and PTMG.

In the formula (I), n of PEG shown as the diol of the formula (I) in which m is 1 is an integer of from 2 to 4, and PEG is preferably triethylene glycol (n=3) and tetraethylene glycol (n=4).

If PEG of the formula (I) in which n is 5 or more is used as the main component, the barrier property for odor of the polyester film obtained is greatly lowered, which is not preferred.

On the other hand, n of PTMG shown as the diol of the formula (I) in which m is 2 is the average value calculated from the number average molecular weight of PTMG and is a real number of from 6 to 55, and preferably a real number of from 8 to 28.

If the average value n is less than 6, the effect of imparting flexibility to the polyester film obtained is poor, while if the average value n is over 55, the barrier property for odor of the polyester film obtained by copolycondensation is greatly lowered, which are not preferred.

The content of PTMG in the copolyester used in the present invention is from 0 to 3 mole %, preferably from 0.2 to 2 mole %, based on all the acid components.

When the content of PTMG being used in the present invention is less than 0.2 mole % based on the total acid components therein, the contents of 1,4-butanediol and PEG in the polyester are from 55 mole % to 85 mole % and from 15 mole % to 45 mole %, respectively, and preferably from 60 mole % to 80 mole % and from 20 mole % to 40 mole %, respectively in 100 mole % of the total diol components excluding PTMG. If the content of PEG is less than 15 mole %, the necessary flexibility is not obtained, while if the content of PEG is over 45 mole %, the melting point of the polyester obtained is lowered, whereby the necessary heat resistance is not obtained, and also the barrier property for odor is lowered, which are not preferred.

Also, when the content of PTMG to the total acid components in the copolyester is from 0.2 mole % to 3 mole %, the contents of 1,4-butanediol and PEG in the polyester are from 55 mole % to 90 mole % and 10 mole % to 45 mole %, respectively, and preferably from 70 mole % to 85 mole % and from 15 mole % to 30 mole %, respectively in 100 mole % of the total diol components excluding PTMG. If the content of PEG is less than 10 mole %, the necessary flexibility is not obtained, while if the content of PEG is over 45 mole %, the melting point of the polyester obtained is lowered, whereby the necessary heat resistance is not obtained, and also the barrier property for odor is lowered, which are not preferred.

In the present invention, by further adding a surface active agent of a specific structure having a hydroxy group to the copolyester, a polyester film excellent in the self-adherence property is provided. That is, as such a surface active agent, at least one kind of compound selected from the compound shown by the formula (II), the compound shown by the formula (III) described above, and the sorbitan fatty acid ester (having from 8 to 22 carbon atoms in fatty acid moiety) is used singly or as a mixture of these compounds.

The carbon atom number of the fatty acid component constituting the compound shown by the formula (II), the compound shown by the formula (III) and the sorbitan fatty acid ester being used in the present invention is from 8 to 22, and preferably from 8 to 18.

Also, l in the formula (II) is an integer of from 0 to 3, and preferably 0 or 1.

As the compound shown by the formula (II) described above, there is, specifically, the ester of a mono-, di-, tri-, or tetra-glycerol and a fatty acid selected from caprylic acid, pelargonic acid, capric acid, undecylic acid, lauric acid, tridecylic acid, myristic acid, pentadecylic acid, stearic acid, nonadecanoic acid, arachic acid, behenic acid, undecylenic acid, oleic acid, elaidic acid, cetoleic acid, erucic acid, brassidic acid, linoleic acid, linolenic acid, and arachidonic acid. In these esters, the ester of mono- or di-glycerol and the fatty acid selected from undecylic acid, lauric acid, tridecylic acid, myristic acid, pentadecylic acid, stearic acid, nonadecanoic acid, oleic acid, linoleic acid, and linolenic acid is preferred.

As the compound shown by the formula (III) described above, there is the ester of propylene glycol and a fatty acid selected from caprylic acid, pelargonic acid, capric acid, undecylic acid, lauric acid, tridecylic acid, myristic acid, pentadecylic acid, stearic acid, nonadecanoic acid, arachic acid, behenic acid, undecylenic acid, oleic acid, elaidic acid, cetoleic acid, erucic acid, brassidic acid, linoleic acid, linolenic acid, and arachidonic acid. In these esters, the ester of propylene glycol and the fatty acid selected from undecylic acid, lauric acid, tridecylic acid, myristic acid, pentadecylic acid, stearic acid, nonadecanoic acid, oleic acid, linoleic acid, and linolenic acid is preferred.

Also, as the sorbitan fatty acid ester, there is the ester of sorbitan and a fatty acid selected from caprylic acid, pelargonic acid, capric acid, undecylic acid, lauric acid, tridecylic acid, myristic acid, pentadecylic acid, stearic acid, nonadecanoic acid, arachic acid, behenic acid, undecylenic acid, oleic acid, elaidic acid, cetoleic acid, erucic acid, brassidic acid, linoleic acid, linolenic acid, and arachidonic acid. In these esters, the ester of sorbitan and the fatty acid selected from undecylic acid, lauric acid, tridecylic acid, myristic acid, pentadecylic acid, stearic acid, nonadecanoic acid, oleic acid, linoleic acid, and linolenic acid is preferred.

The foregoing surface active agents can be used singly or as a mixture of them.

The content of the surface active agent is from 1.5 parts by weight to 10 parts by weight, and preferably from 2 parts by weight to 7.5 parts by weight based on 100 parts by weight of the copolyester. If the content of the surface active agent is less than 1.5 parts by weight, the adherent property is insufficient and if the content thereof is over 10 parts by weight, the surface of the polyester film becomes sticky, which are not preferred.

The copolyester being used in the present invention can further contain other components than the foregoing dicarboxylic acid(s) and diol(s) in addition to them as copolycondensation component(s) in the range of the desired objects of this invention. Examples of the dicarboxylic acid component which can be used as such an other copolycondensation component are isophthalic acid, phthalic acid, 2,6-naphthalenedicarboxylic acid, adipic acid, and sebacic acid and examples of the diol component which can be used as another copolycondensation component are ethylene glycol, polyethylene glycol having a molecular weight of at least 238, propylene glycol, neopentyl glycol, 1,5-pentanediol, and 1,6-hexanediol. Also, a small amount of three or more functional carboxyic acid and a hydroxy compound can be copolycondensed in the copolyester being used in this invention.

The copolyester being used in the present invention may contain, if necessary, various additives such as a lubricant, an antiblocking agent, a stabilizer, etc. In particular, in the case of the polyester being used in the present invention, it is desirable to add thereto an antioxidant such as a hindered phenol series antioxidant, a thiopropionic acid ester, a fatty acid sulfide, a fatty acid disulfide, phosphite, thiophosphite, etc.

The molecular weight of the copolyester being used in this invention obtained as described above is defined to be from 0.8 dl/g to 1.6 dl/g, and preferably from 0.9 dl/g to 1.6 dl/g as a reduced viscosity. If the reduced viscosity of the copolyester is less than 0.8 dl/g, the copolyester is inferior in the film-forming property and, particularly, in the orienting property of the film of the polyester and if the reduced viscosity is over 1.6 dl/g, it becomes difficult to form a non-oriented film of the polyester.

It is necessary that the copolyester film of the present invention is in-plane oriented in the range of the planar orientation of from 0.04 to 0.15, and preferably from 0.06 to 0.13. By giving an orientation to a film, the change of the elastic modulus of the copolyester film near the glass transition temperature with the passage of time is reduced and also the barrier property for odor is improved. Also, the planar orientation is usually applied by a uniaxial stretching or a biaxial stretching and by applying the orientation to the copolyester-film of this invention, the performance of the film can be improved while keeping the flexibility because of the reduced change of the elastic modulus. If the planar orientation is less than 0.04, the stability of the change of the film with the passage of time is undesirably insufficient. Also, it is difficult to prepare the oriented film having the planar orientation over 0.15 and hence such an oriented film is not practical.

The melting point of the copolyester of the present invention is preferably from 160° C. to 210° C., and more preferably from 170° C. to 210° C. If the melting point of the polyester film is lower than 160° C., the film does not meet the heat resistance at heating in a microwave oven required as a wrapping film, while if the melting point is over 210° C., a balance with the flexibility is reluctant to obtain.

The tensile elastic modulus of the copolyester film of the present invention is preferably from 3,000 kg/cm$^2$ to 16,000 kg/cm$^2$, and more preferably from 3,500 kg/cm$^2$ to 12,000 kg/cm$^2$. If the tensile elastic modulus is less than 3,000 kg/cm$^2$, the film is insufficient in the stiffness, whereby the handle-ability of the film becomes poor, while if the tensile elastic modulus is over 16,000 kg/cm$^2$, the film is insufficient in the flexibility, whereby wrapping with the film becomes difficult.

The thickness of the copolyester film of the present invention is preferably from 5 μm to 50 μm, and more preferably from 7 μm to 40 μm. If the thickness of the copolyester film is thinner than 5 μm, it becomes difficult to handle as a film, while if the thickness is thicker than 50 μm, the fitness of the film for a container form is bad, whereby packaging of containers, etc., becomes difficult.

There are no particular restrictions on the production methods of the copolyester being used in the present invention and the polyester film of the present invention but, for example, the polyester can be obtained by adding dicarboxylic acid(s) or the alkyl ester(s) thereof and the diol component(s) corresponding to them, adding a well-known catalyst, such as tetraisobutyl titanate, to the mixture, and producing by a well-known polyester polycondensation method, as is disclosed in *Saturated Polyester Resin Handbook*, edit. by Kazuo Yuki, Nikkankogyo Co., Ltd. (1989).

The copolyester composition containing the surface active agent described above is obtained by after finishing the copolycondensation, adding the surface active agent to the copolycondensation product followed by mixing in the reaction vessel and taking out the mixed product or by kneading the copolyester and the surface active agent by a single or twin screw extruder.

The polyester film of the present invention can be formed by a flat method using a T die or a tubular method using a circular die. Also, the stretching may be a uniaxial stretching or a biaxial stretching and is carried out using a tenter method, an inflation method, etc. In the case of reducing the tear anisotropy, a biaxial stretching is preferred.

The oriented polyester film can be heat-set by a proper condition. According to the heat-setting condition, the heat-shrinkage percentage of the film can be controlled. When the copolyester film is used as a wrapping film, it is preferred that the heat-shrinkage percentage of the film is low and further it is preferred to heat-set the film at a temperature of lower than the melting point of the film or, when the cold crystallization temperature is observed, at a temperature higher than the temperature for from 1 second to 30 minutes.

The polyester film of the present invention is preferably used as a wrapping film for the preservation of foods and for wrapping foods at cooking with microwave (a microwave oven).

Then, the evaluation methods of the characteristics of the polyester being used in this invention and the copolyester film of this invention are described below.

(Composition)

The composition of each copolyester was measured by 270 MHz $^1$HNMR (manufactured by JEOL LTD.) using trifluoroacetic acid chloroform-d (½ by weight ratio) as the solvent for the copolyester.

(Reduced viscosity)

The reduced viscosity was measured under the conditions of a concentration of 0.1 g/dl and 25° C. using orthochlorophenol as the solvent by using Ostwald's viscometer.

(Melting point)

The maximum value of the melt exothermic peaks measured using DSC (DSC 7, trade name, manufactured by Perkin Elmer Co.) at a temperature raising speed of 20° C./minute was employed as the melting point.

(Tensile elastic modulus)

The tensile elastic modulus was obtained from the initial elastic modulus measured on each film of 10 mm width under the conditions of a distance between chucks of 100 mm, a tensile speed of 1 mm/minute, and a temperature of 23° C. by using a tensile test apparatus (Autograph, trade name, manufactured by Shimadzu Corp.).

(Self-adherence property)

After closely adhering and fixing each film to each flat outer surface of the bottoms of two columns each having the bottom surface diameter of 56 mm such that the film was not creased, the bottom surfaces of the two columns were brought into contact with each other such that the films of the bottom surfaces were superposed to each other. Then, a load of 500 g was uniformly applied to the contact surfaces and the assembly was allowed to stand for one minute. Thereafter, the contact surfaces were separated perpendicularly using a tensile tester (Autograph AG-5000D, trade name, manufactured by Shimadzu Corporation) and the work required to separate the surfaces of the two films each other was measured. The measurement was carried out in a room of 23° C.

The self-adherence property was evaluated to be "⊚" when the work was 10 g·cm or more, "○" when the work was from 3 g·cm to less than 10 g·cm, and "x" when the work was less than 3 g·cm.

(Planar orientation)

The refractive indexes in the direction perpendicular to the film surface (Nz) and in the two oriented directions in the film plane or in one oriented direction of the film and the direction perpendicular to the oriented direction in the film plane (Nx and Ny) were measured using an Abbe's refractometer (Atago 1T manufactured by Atago Co.), and the planar orientation (P) of the film was calculated by the following formula.

$$P = |(Nx+Ny)/2 - Nz|$$

(Barrier property for odor)

In a circular glass vessel having a volume of 200 ml and the diameter of the open portion of 75 mm was placed 5 ml of a strawberry essence (manufactured by Meijiya Co.), the open portion was closed with a sample film, the glass vessel was placed in a stainless steel container of 6 liters in volume having a lid, and the container was stored in a room of 23° C. After 24 hours, the inside of the 6 liter vessel was sniffed. In this test, when almost no odor was smelled, the barrier property for odor of the sample film was evaluated to be "⊚", when a strawberry essence odor was smelled a little, the barrier property for odor was evaluated to be "○", and when the inside of the vessel was strongly smelled, the barrier property for odor was evaluated to be "x".

(Film thickness)

The thickness of the test film was measured using a stylus contact-type film thickness gauge (Techrock).

(Number average weight of PTMG)

The number average molecular weight (M) determining n of PTMG was calculated by the following formula $$M = 112200/\text{OH value}$$

based in the hydroxyl value (OH value) of PTMG.

BEST MODE FOR PRACTICING THE INVENTION

Then, the invention is explained practically by the following examples.

EXAMPLE 1

| | |
|---|---|
| Diemthyl terephthalate | 100 parts by weight |
| 1,4-Butanediol | 80.1 parts by weight |
| Triethylene glycol | 44.5 parts by weight |
| Pentaerythtyl-tetrakis[3-(3,5-di-t-butyl-4-hydroxyphenyl)propionate] | 0.06 parts by weight |

The above components were placed in a reaction vessel made of stainless steel, after dissolving the content by heating the mixture to 150° C., tetraisopropyl titanate was added to the solution as a catalyst, and a transesterification reaction was carried out for 3 hours while raising the temperature up to 220° C. and while removing methanol produced and tetrahydrofuran titanate by-produced from the system. After further adding thereto tetraisopropyl titanate, the reaction vessel was evacuated below 1 mm Torr over a period of one hour and at the same time the temperature of the reaction vessel was raised up to 240° C. Thereafter, the condensation reaction was continued for 6 hours under the conditions of a high vacuum below 1 mm Torr and a temperature of 240° C.

The polymer thus obtained contained 69 mole % of 1,4-butanediol and 31 mole % of triethylene glycol in 100 mole % of the total diols, the reduced viscosity of the polymer was 1.2 dl/g, and the melting point thereof was 181° C.

For simply evaluating the characteristics of the film of the copolyester obtained, the polyester was press-molded into a film at a temperature of 220° C. and a pressure of 60 kg/cm$^2$ and the film wad quickly cooled to provide the non-oriented film. The film was simultaneously bi-axially stretched to an area of 3.2×3.2 times using a bi-axially stretching machine at a temperature of 70° C. and a speed of 300%/minute to provide the film of 37 μm thick.

The evaluation results of the film obtained are shown in Table 1 below.

EXAMPLES 3 TO 9

Copolyesters each containing diethylene glycol, triethylene glycol or tetraethylene glycol in a different amount each were synthesized by the same manner as in Example 1. In each case, the content of pentaerythtyl-tetrakis[3-(3,5-di-t-butyl-4-hydroxyphenyl) propionate] was about 0.05 parts by weight in each polymer. Then, each non-oriented film was prepared by heat pressing as in Example 1 to provide a non-oriented film and the film was simutaneously bi-axially stretched to an area of a definite times. The heat press was practiced at a temperature of about 30° C. higher than the melting point of each polymer and the stretching ratio are shown in Table 1 below. Furthermore, some of the films were heat-set as in Example 2. The setting temperature was about 40° C. lower than the melting point of each polymer. The applied cases of the heat setting are shown in Table 1.

The evaluation results are shown in Table 1 below.

TABLE 1

| | Copolyester | | | | | | |
|---|---|---|---|---|---|---|---|
| | Composition (mole %) | | | | | Reduced viscosity | Melting point |
| | TPA | BD | DEG | TEG | TeEG | (dl/g) | (°C.) |
| Example 1 | 100 | 69 | 0 | 31 | 0 | 1.2 | 181 |
| Example 2 | 100 | 69 | 0 | 31 | 0 | 1.2 | 181 |
| Example 3 | 100 | 69 | 0 | 31 | 0 | 1.2 | 181 |
| Example 4 | 100 | 75 | 0 | 25 | 0 | 1.2 | 189 |
| Example 5 | 100 | 75 | 0 | 25 | 0 | 1.2 | 189 |
| Example 6 | 100 | 62 | 0 | 38 | 0 | 1.0 | 164 |
| Example 7 | 100 | 62 | 0 | 38 | 0 | 1.0 | 164 |
| Example 8 | 100 | 56 | 44 | 0 | 0 | 1.0 | 163 |
| Example 9 | 100 | 72 | 0 | 0 | 29 | 1.3 | 175 |

| | Copolyester Film | | | | | |
|---|---|---|---|---|---|---|
| | Tensile elastic modulus (kg/cm$^2$) | Barrier property for odor | Film thickness (μm) | Stretching ratio | Heat setting | Planar orientation |
| Example 1 | 10300 | ⊙ | 37 | 3.2 × 3.2 | x | 0.09 |
| Example 2 | 7000 | ⊙ | 35 | 3.2 × 3.2 | ○ | 0.09 |
| Example 3 | 7200 | ⊙ | 33 | 3.5 × 3.5 | ○ | 0.10 |
| Example 4 | 12800 | ⊙ | 38 | 3.2 × 3.2 | ○ | 0.11 |
| Example 5 | 15900 | ⊙ | 34 | 3.2 × 3.2 | x | 0.10 |
| Example 6 | 4100 | ⊙ | 36 | 3.2 × 3.2 | ○ | 0.07 |
| Example 7 | 3600 | ○ | 37 | 2.5 × 2.5 | ○ | 0.06 |
| Example 8 | 12400 | ⊙ | 35 | 3.2 × 3.2 | x | 0.10 |
| Example 9 | 3500 | ○ | 33 | 3.2 × 3.2 | x | 0.08 |

TPA: Terephthalic acid
BD: 1,4-Butanediol
DEG: Diethylene glycol
TEG: Triethylene glycol
TeEG: Tetraethylene glycol
Heat fixation
○: Applied
x: Not applied

EXAMPLE 2

A bi-axially stretched film obtained by the same procedure as Example 1 was fixed in a frame and allowed to stand for 90 seconds in an oven of 140° C. to carry out a heat setting.

The evaluation results of the film thus obtained are shown in Table 1 below.

EXAMPLE 10

| | |
|---|---|
| Dimethyl terephthalate | 100 parts by weight |
| 1,4-Butanediol | 85.4 parts by weight |
| Triethylene glycol | 35.6 parts by weight |

-continued

| | |
|---|---|
| PTMG (number average molecular weight 1000) | 2.57 parts by weight |
| Pentaerythyl-tetrakis[3-(3,5-di-t-butyl-4-hydroxyphenyl)propionate] | 0.06 parts by weight |

The above components were placed in a reaction vessel made of stainless steel, after heating the content to 150° C. to dissolve the content, tetraisopropyl titanate was added to the solution as a catalyst, and the transesterification was carried out for 2.5 hours while raising the temperature up to 220° C. and while removing methanol formed and tetrahydrofuran by-produced from the system. After further adding thereto tetraisopropyl titanate, the reaction vessel was evacuated to a high vacuum below 1 mm Torr over one hour and at the same time the temperature was raised up to 240° C. Thereafter, the condensation reaction was continued for 6 hours under the conditions of a high vacuum below 1 mm Torr and a temperature of 240° C.

The polymer thus obtained had the composition that the contents of 1,4-butanediol and triethylene glycol were 75 mole % and 25 mole %, respectively in 100 mole % the total diols and the content of PTMG was 0.6 mole % (converted as the molecule weight of 1000) based on 100 mole % the terephthalic acid component, the reduced viscosity of the polymer was 1.0 dl/g, and the melting point was 189° C.

For simply evaluating the characteristics of the film of the copolyester obtained, the polyester was press-molded into a film at a temperature of 220° C. and a pressure of 60 kg/cm² and quickly cooled to provide a non-oriented film. Furthermore, the film was simultaneous bi-axially stretched to an area of 3.2×3.2 times using a bi-axially stretching machine at a temperature of 70° C. and a speed of 300%/minute. Then, the bi-axially oriented film was fixed to a frame, allowed to stand in an oven at 150° C. for 90 seconds to carry out the heat setting and to provide the film of 35 μm thick.

The evaluation results of the film obtained are shown in Table 2 below.

EXAMPLES 11 TO 18

Copolyesters each having a different molecular weight and composition of PTMG and a different content of diethylene glycol, triethylene glycol, or tetraethylene glycol were synthesized by the same procedure as in Example 10. In each polyester, the content of pentaerythtyl-tetrakis[3-(3,5-di-t-butyl-4-hydroxyphenyl) propionate] was about 0.05 part by weight in the polymer. Then, each non-oriented film was formed by heat pressing as in Example 10 and simultaneously bi-axially stretched to as area of 3.2×3.2 times. The heat press was practiced at a temperature of about 30° C. higher than the melting point of the polymer. Furthermore, some of the films were heat-set. The heat setting was practiced at a temperature of about 40° C. lower than the melting point of the polymer. The application of the heat setting was shown in Table 2 below.

The evaluation results of these films are shown in Table 2.

TABLE 2

| | Copolyester | | | | | | | | |
|---|---|---|---|---|---|---|---|---|---|
| | Composition (mole %) | | | | | | Number average | Reduced | M.P. |
| | TPA | BD | DEG | TEG | TeEG | PTMG | mol. wt. of PTMG | viscosity (dl/g) | (°C.) |
| Example 10 | 100 | 75 | 0 | 25 | 0 | 0.6 | 1000 | 1.0 | 189 |
| Example 11 | 100 | 75 | 0 | 25 | 0 | 1.0 | 1000 | 1.1 | 191 |
| Example 12 | 100 | 75 | 0 | 25 | 0 | 1.0 | 1000 | 1.1 | 191 |
| Example 13 | 100 | 81 | 0 | 19 | 0 | 1.2 | 1000 | 1.1 | 197 |
| Example 14 | 100 | 74 | 0 | 26 | 0 | 2.0 | 650 | 1.3 | 186 |
| Example 15 | 100 | 77 | 0 | 23 | 0 | 0.9 | 1400 | 1.2 | 192 |
| Example 16 | 100 | 75 | 0 | 25 | 0 | 0.5 | 2000 | 1.2 | 190 |
| Example 17 | 100 | 61 | 39 | 0 | 0 | 0.8 | 1000 | 1.2 | 176 |
| Example 18 | 100 | 79 | 0 | 0 | 21 | 1.0 | 1000 | 1.0 | 190 |

| | Copolyester Film | | | | |
|---|---|---|---|---|---|
| | Tensile elastic property (kg/cm²) | Barrier property for odor | Film thickness (μm) | Heat setting | Planar orientation |
| Example 10 | 7600 | ◎ | 35 | ○ | 0.08 |
| Example 11 | 6900 | ◎ | 36 | x | 0.08 |
| Example 12 | 4300 | ○ | 38 | ○ | 0.08 |
| Example 13 | 7300 | ○ | 39 | ○ | 0.08 |
| Example 14 | 6800 | ◎ | 35 | ○ | 0.09 |
| Example 15 | 7500 | ◎ | 36 | ○ | 0.10 |
| Example 16 | 7300 | ◎ | 37 | ○ | 0.11 |
| Example 17 | 11500 | ◎ | 36 | ○ | 0.11 |
| Example 18 | 6500 | ○ | 36 | ○ | 0.10 |

TPA: Terephthalic acid
BD: 1,4-Butanediol
DEG: Diethylene glycol
TEG: Triethylene glycol
TeEG: Tetraethylene glycol
PTMG: Polytetramethylene glycol (the composition was converted as the number average molecular weight)

TABLE 2-continued

Mol. WT.: Molecular weight
M.P.: Melting point
Heat fixation:
○: Applied.
x: Not applied.

EXAMPLE 19

The tensile elastic modulus of the bi-axially stretched film obtained in Example 1 was measured after one day and after 2 weeks since the stretching and the stability of the elastic modulus of the film with the passage of time was evaluated.

The evaluation result is shown in Table 3 below.

Comparative Example 1

A non-oriented polyester film was obtained by heat pressing according to the same procedure as in Example 1. The tensile elastic modulus of the film was measured after one day and after 2 weeks since the formation of the non-oriented film and the stability of the elastic modulus of the film with the passage of time was evaluated.

The evaluation result is shown in Table 3 below.

TABLE 3

| | Tensile Elastic Modulus (kg/cm$^2$) | | Changed Ratio |
|---|---|---|---|
| | After 1 day | After 2 weeks | (%) |
| Example 19 | 10300 | 10500 | 1.9 |
| Comparative Example 1 | 3200 | 7300 | 128 |

EXAMPLE 20

The copolyester as used in Example 1 was extruded using an extruding machine of 40 mm and a T die to provide a non-oriented film of about 100 μm thick. The film was simultaneously bi-axially stretched using a bi-axially stretching machine at a temperature of 70° C. and at a speed of 300%/minute to provide a bi-axial stretched film of 10 μm thick. The film was fixed to a frame and heat-set at 140° C. for 90 seconds. The evaluation results of the film are shown in Table 4 below.

The tensile elastic modulus of the film was measured twice after one day and after 2 weeks since the heat setting and for other evaluation, measurements were done after 2 weeks only since the heat setting.

Comparative Example 2

A non-oriented film of 9 μm thick was formed using a T die as in Example 20. The evaluation results of the non-oriented film are shown in Table 4 below.

The tensile elastic modulus of the film was measured twice after one day and after 2 weeks since the formation of the film and for other evaluation, measurements were done after 2 weeks only since the formation of the film.

TABLE 4

| | Copolyester | | | | |
|---|---|---|---|---|---|
| | Composition (mole %) | | | Reduced viscosity | Melting point |
| | TPA | BD | TEG | (dl/g) | (°C.) |
| Example 20 | 100 | 69 | 31 | 1.2 | 181 |
| Comparative Example 2 | 100 | 69 | 31 | 1.2 | 181 |

| | Copolyester Film | | | | | | |
|---|---|---|---|---|---|---|---|
| | Tensile Elastic Modulus (kg/cm$^2$) | | Barrier property for odor | Film thickness (μm) | Stretching ratio | Heat setting | Planar orientation |
| | After 1 day | After 2 weeks | | | | | |
| Example 20 | 7300 | 7400 | ⊙ | 10 | 3.0 × 3.0 | ○ | 0.08 |
| Comparative Example 2 | 3000 | 6400 | ○ | 9 | 1.0 × 1.0 | x | 0.005 |

Heat fixation:
○: Applied
x: Not applied.

EXAMPLE 21

To 100 parts of the polyester as used in Example 4 was added 5 parts by weight of diglycerol monooleate and the mixture was kneaded using a kneader at 210° C. to provide a copolyester composition. The composition obtained was press-molded at a temperature of 220° C. and a pressure of 60 kg/cm$^2$ and quickly cooled to provide a non-oriented film. Furthermore, the film was simultaneously bi-axially stretched to an area of 3.2×3.2 times using a bi-axially stretching machine at a temperature of 70° C. and a speed of 300%/minute to provide a film of 36 μm thick.

The evaluation results of the film are shown in Table 5 below.

EXAMPLES 22 TO 39

By kneading each of the various polyesters used in the examples described above with a definite amount of each of some compounds as in Example 21, each of the copolyester compositions was obtained. The example numbers of the compositions corresponding to the polyesters used are shown in Table 5 below. Also, the kneaded compounds and the added amounts (parts by weight) to 100 parts by weight of the copolyester are shown in Tables 5 and 6. Each polyester composition obtained was press-molded to form a non-oriented film according to the procedure as in Example 21 and the film was simultaneously bi-axially stretched to an area of 3.2×3.2 times to provide a bi-axially stretched film. The heat press was practiced at a temperature of about 30° C. higher than the melting point of each copolyester. Some of the oriented films were fixed to a frame and heated at a temperature of about 40° C. lower than the melting point of the copolyester to be heat-set. The application of the heat setting is shown in Tables 5 and 6.

The evaluation results are shown in Tables 5 and 6 below.

TABLE 5

| | Examples of Copolycondensed Polyester Used | Kneaded Compounds Compound | Kneaded amount (part by weight) |
|---|---|---|---|
| Example 21 | Example 4 | Diglycerol monooleate | 5.0 |
| Example 22 | Example 1 | Diglycerol monooleate | 2.0 |
| Example 23 | Example 1 | Diglycerol monooleate | 5.0 |
| Example 24 | Example 1 | Glycerol monooleate | 5.0 |
| Example 25 | Example 1 | Glycerol monooleate | 1.0 |
| Example 26 | Example 1 | Sorbitan laurate | 5.0 |
| Example 27 | Example 1 | Propylene glycol monolaurate | 5.0 |
| Example 28 | Example 1 | Propylene glycol monooleate | 5.0 |
| Example 29 | Example 1 | Glycerol diaceto-monolaurate | 5.0 |
| Example 30 | Example 1 | Glycerol | 5.0 |
| Example 31 | Example 1 | Dioctyl adipate | 5.0 |
| Example 32 | Example 6 | Diglycerol monooleate | 2.0 |

| | Copolyester Film Characteristics | | | | |
|---|---|---|---|---|---|
| | Heat setting | Film thickness ($\mu$m) | Tensile elastic modulus (kg/cm$^2$) | Self-adherent property | Planar orientation |
| Example 21 | x | 36 | 10000 | ○ | 0.09 |
| Example 22 | x | 43 | 7000 | ○ | 0.09 |
| Example 23 | x | 32 | 4700 | ◉ | 0.08 |
| Example 24 | x | 34 | 5100 | ◉ | 0.08 |
| Example 25 | x | 38 | 7500 | x | 0.09 |
| Example 26 | x | 33 | 4200 | ◉ | 0.08 |
| Example 27 | x | 34 | 4400 | ○ | 0.08 |
| Example 28 | x | 35 | 6000 | ○ | 0.08 |
| Example 29 | x | 43 | 3900 | x | 0.07 |
| Example 30 | x | 35 | 9200 | x | 0.10 |
| Example 31 | x | 35 | 4600 | x | 0.08 |
| Example 32 | x | 36 | 3000 | ◉ | 0.07 |

Heat fixation:
○: Applied.
Not applied.

TABLE 6

| | Examples of Copolycondensed Polyester Used | Kneaded Compounds Compound | Kneaded amount (part by weight) |
|---|---|---|---|
| Example 33 | Example 17 | Sorbitan laurate | 5.0 |
| Example 34 | Example 14 | Sorbitan laurate | 5.0 |
| Example 35 | Example 10 | Sorbitan laurate | 5.0 |
| Example 36 | Example 16 | Sorbitan laurate | 5.0 |
| Example 37 | Example 18 | Sorbitan laurate | 5.0 |
| Example 38 | Example 10 | Glycerol diaceto-monolaurate | 5.0 |
| Example 39 | Example 10 | Dioctyl adipate | 5.0 |

| | Copolyester Film Characteristics | | | | |
|---|---|---|---|---|---|
| | Heat setting | Film thickness ($\mu$m) | Tensile elastic modulus (kg/cm$^2$) | Self-adherent Property | Planar orientation |
| Example 33 | ○ | 40 | 5100 | ◉ | 0.09 |
| Example 34 | ○ | 40 | 3800 | ◉ | 0.08 |
| Example 35 | ○ | 41 | 4500 | ◉ | 0.09 |
| Example 36 | ○ | 42 | 4300 | ◉ | 0.09 |
| Example 37 | ○ | 41 | 3400 | ◉ | 0.11 |
| Example 38 | ○ | 38 | 4200 | x | 0.08 |
| Example 39 | ○ | 39 | 4700 | x | 0.09 |

Heat fixation:
○: Applied.
x: Not applied.

EXAMPLE 40

By kneading 100 parts by weight of the copolyester as used in Example 1 with 5 parts by weight of sorbitan laurate by a twin screw extruding machine of 25 mm, a copolyester composition was obtained. The composition was extruded into a film using an extruding machine of 40 mm and a T die having a width of 80 mm to provide a non-oriented film of about 100 $\mu$m thick. Furthermore, the film was simultaneously bi-axially stretched to an area of 3×3 times using a bi-axially stretching machine at a temperature of 70° C. and at a speed of 300%/minute. The stretched film was fixed to a frame and heat-set in an oven at 140° C. for 90 seconds to provide a film of 10 μm thick.

The evaluation result is shown in Table 7.

EXAMPLES 41 TO 43

Each the various copolyesters used in the examples described above was kneaded with a definite amount of sorbitan monolaurate as in Example 40 to provide each copolyester composition. The examples of the compositions corresponding to the polyesters used are shown in Table 7. Also, the addition amounts (parts by weight) of sorbitan laurate kneaded to 100 parts by weight of the copolyester are shown in Table 6 below. Then, from each copolyester composition obtained, a 3×3 times stretched and heat-set film was obtained. The heat setting was practiced at a temperature of about 40° C. lower than the melting point of the copolyester.

The evaluation results are shown in Table 7 below.

TABLE 7

| Examples of | Kneaded Compounds | |
|---|---|---|
| Copolyester Used | Compound | Kneaded amount (part by weight) |
| Example 40 | Example 1 | Sorbitan laurate | 5.0 |
| Example 41 | Example 10 | Sorbitan laurate | 5.0 |
| Example 42 | Example 10 | Sorbitan laurate | 7.5 |
| Example 43 | Example 18 | Sorbitan laurate | 5.0 |

| | Copolyester Film Characteristics | | | |
|---|---|---|---|---|
| | Film thickness (μm) | Tensile elastic modulus (kg/cm$^2$) | Self-adherent property | Planar orientation |
| Example 40 | 10 | 4000 | ⊚ | 0.08 |
| Example 41 | 16 | 5000 | ⊚ | 0.09 |
| Example 42 | 13 | 4700 | ⊚ | 0.08 |
| Example 43 | 17 | 4800 | ⊚ | 0.07 |

EXAMPLE 44

The copolyester composition as used in Example 41 was extruded from a circular die having a diameter of 100 mm with an extruding machine of 40 mm and quickly cooled with cold water to provide a film of about 100 μm. The film was further simultaneously bi-axially stretched to an area of 3×3 times using a bi-axially stretching machine at 90° C. and at a speed of 300%/minute. The stretched film was fixed to a frame and heat-set in an oven at 150° C. for 90 seconds to provide a film of 12 μm thick.

The evaluation results of the film are shown in Table 8 below.

TABLE 8

| | Film thickness (μm) | Tensile elastic modulus (kg/cm$^2$) | Self-adherence property |
|---|---|---|---|
| Example 44 | 12 | 4000 | ⊚ |

EXAMPLE 45

Using the copolyester as used in Example 40, a 3-layer non-oriented film composed of the center layer of copolymer of ethylene and vinylacetate (EVA) of about 60 μm thick and the inner and outer layers of the polyester of about 80 μm thick each was formed using a 3-layer circular die. The film was then subjected to an inflation stretching in an atmosphere of about 50° C. to be stretched to an area of 2.6×2.2 (MD×TD). The copolyester composition film layer was released, fixed to a frame, and heat-set in an oven at 140° C. for 90 seconds to provide a film of 10 μm thick.

The evaluation results of the film are shown in Table 9 below.

TABLE 9

| | Film thickness (μm) | Tensile elastic modulus (kg/cm$^2$) | | Self-adherence property |
|---|---|---|---|---|
| | | MD | TD | |
| Example 45 | 10 | 4500 | 5000 | ⊚ |

POSSIBLE UTILITIES IN INDUSTRY

As described above, since the copolyester film of the present invention has a high heat resistance, is excellent in the barrier property for odor, and has a proper flexibility, the film is particularly suitable for a wrapping film for wrapping foods. Also, by incorporating a specific surface active agent in the polyester film, the film having an excellent self-adherence property is obtained.

We claim:

1. A copolyester film having a planar orientation of from 0.04 to 0.15, wherein said copolyester has a reduced viscosity of from 0.8 dl/g to 1.6 dl/g and comprises dicarboxylic acid components including terephthalic acid as a main component, 1,4-butanediol, and diol components including at least one kind of diol represented by following formula (I), wherein when the content of the diol of the formula (I) in which m is 2 is less than 0.2 mole % based on all the acid components, the content of 1,4-butanediol is from 55 mole % to 85 mole % and the content of the diol of the formula (I) in which m is 1 is from 15 mole % to 45 mole % in 100 mole % of the total diol components excluding the diol of the formula (I) in which m is 2; and when the content of the diol of the formula (I) in which m is 2 is from 0.2 moles % to 3 moles %, the content of 1,4-butanediol is from 55 mole % to 90 mole % and the content of the diol of the formula (I) in which m is 1 is from 10 mole % to 45 mole % in 100 mole % of the total diol components excluding the diol of the formula (I) in which m is 2;

(I)

wherein m is 1 or 2, when m is 1, n is an integer of from 2 to 4, and when m is 2, n is a real number of from 6 to 55;

provided that when m is 2 the content of the diol of formula (I) is 0 to 3 mole %, based on all the acid components.

2. A copolyester film as claimed in claim 1, wherein the copolyester film contains at least 2 kinds of the diols of the formula (I).

3. A copolyester film as claimed in claim 1, wherein the copolyester film contains the diol of the formula (I) in which m is 1 and the diol of the formula (I) in which m is 2.

4. A copolyester film as claimed in one of claims 1 to 3, wherein the copolyester film contains in total from 1.5 to 10 parts by weight of at least one kind of the compound selected from the compounds represented by following formula (II), the compound represented by following formula (III), and sorbitan fatty acid esters (having from 8 to 22 carbon atoms in fatty acid moiety) based on 100 parts by weight of the copolyester of the polyester film;

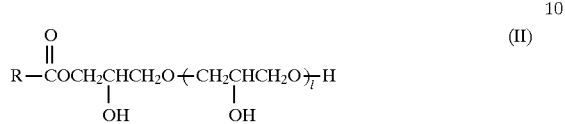
(II)

wherein l represents an integer of from 0 to 3 and R represents the alkyl residue of a saturated or unsaturated fatty acid having from 8 to 22 carbon atoms;

(III)

wherein R represents the alkyl residue of a saturated or unsaturated fatty acid having from 8 to 22 carbon atoms.

5. A copolyester film as claimed in claim 4 wherein the melting point of the copolyester film is from 160° C. to 210° C.

6. A copolyester film as claimed in claim 4 wherein tensile elastic modulus of the copolyester film is from 3,000 kg/cm$^2$ to 16,000 kg/cm$^2$.

* * * * *

UNITED STATES PATENT AND TRADEMARK OFFICE
CERTIFICATE OF CORRRECTION

PATENT NO. : 5,770,317
DATED : June 23, 1998
INVENTOR(S) : Katsuhiko Takaya, et al.

It is certified that error appears in the above-identified patent and that said Letters Patent is hereby corrected as shown below:

On the title page item [56], insert --
FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | 0 | 2 | 0 | 4 | 5 | 2 | 8 | 12/10/1986 | EPO | | | | |
| | | 0 | 0 | 6 | 6 | 9 | 9 | 7 | 12/15/1982 | EPO | | | | |
| | | | | | | | | | | | | | | |

--.

Signed and Sealed this

Second Day of March, 1999

Attest:

Attesting Officer

Q. TODD DICKINSON

Acting Commissioner of Patents and Trademarks